United States Patent
Vu

(12) United States Patent
(75) Inventor: Huy Vu, Quebec (CA)
(73) Assignee: Mitel Networks Corporation, Kanata, Ontario (CA)
(*) Notice: Subject to any disclaimer, the term of this patent is extended or adjusted under 35 U.S.C. 154(b) by 0 days.

(10) Patent No.: US 7,602,888 B2
(45) Date of Patent: Oct. 13, 2009

(54) MENU PRESENTATION SYSTEM

(21) Appl. No.: 10/231,612
(22) Filed: Aug. 30, 2002

(65) Prior Publication Data
US 2003/0043977 A1 Mar. 6, 2003

(30) Foreign Application Priority Data
Aug. 31, 2001 (GB) ................. 0121150.7

(51) Int. Cl.
H04M 11/00 (2006.01)
H04M 1/64 (2006.01)
(52) U.S. Cl. ............. 379/88.18; 379/88.14; 379/88.17
(58) Field of Classification Search ............ 379/67.1, 379/68, 71, 74, 75, 76, 77, 80, 84, 87, 88.01, 379/88.02, 88.03, 88.04, 88.16, 88.17, 88.18, 379/88.22, 88.24, 93.01, 201.014, 88.14; 709/200, 217, 218, 219, 238, 246
See application file for complete search history.

(56) References Cited

U.S. PATENT DOCUMENTS

| 5,884,262 A | 3/1999 | Wise et al. ............ 379/88.01 |
| 5,937,041 A * | 8/1999 | Cardillo et al. ......... 379/93.25 |
| 6,016,336 A * | 1/2000 | Hanson ................. 379/88.23 |
| 6,278,770 B1 * | 8/2001 | Makihata ................. 379/76 |
| 6,449,496 B1 * | 9/2002 | Beith et al. ............. 455/563 |
| 6,487,277 B2 * | 11/2002 | Beyda et al. ........... 379/88.01 |
| 6,594,348 B1 * | 7/2003 | Bjurstrom et al. ....... 379/88.13 |
| 6,614,783 B1 * | 9/2003 | Sonesh et al. ........... 370/352 |
| 6,751,306 B2 * | 6/2004 | Himmel et al. ......... 379/201.02 |
| 6,788,769 B1 * | 9/2004 | Waites ................. 379/93.24 |
| 6,789,107 B1 * | 9/2004 | Bates et al. ............. 709/206 |
| 6,837,789 B2 * | 1/2005 | Garahi et al. ............. 463/29 |
| 6,940,953 B1 * | 9/2005 | Eberle et al. ........... 379/88.13 |
| 7,065,188 B1 * | 6/2006 | Mei et al. .............. 379/88.23 |
| 7,145,898 B1 * | 12/2006 | Elliott ................. 370/352 |
| 7,164,410 B2 * | 1/2007 | Kupka .................. 345/156 |
| 7,457,397 B1 * | 11/2008 | Saylor et al. ........... 379/88.17 |
| 2001/0014146 A1 | 8/2001 | Beyda et al. |
| 2002/0003867 A1 * | 1/2002 | Rothschild et al. ...... 379/88.01 |
| 2002/0032750 A1 * | 3/2002 | Kanefsky ............... 709/218 |

FOREIGN PATENT DOCUMENTS

| EP | 0878947 A2 | 11/1998 |
| EP | 0 973 314 A2 | 1/2000 |
| WO | WO 97/23973 | 7/1997 |
| WO | WO 00/30329 | 5/2000 |
| WO | WO 00/64137 | 10/2000 |
| WO | WO 01/47218 | 6/2001 |

OTHER PUBLICATIONS

Communicatgion from EPO published Mar. 6, 2008.

* cited by examiner

Primary Examiner—Curtis Kuntz
Assistant Examiner—Joseph T Phan

(57) ABSTRACT

A method of presenting an item from a menu of an IVR system for selection is provided, comprising presenting the item to a caller, presenting an audio space to the caller, and detecting any of a number of inputs from an input device during the presentation of the item and the audio space to indicate the selection of the item by the caller.

14 Claims, 6 Drawing Sheets

MENU PRESENTATION SYSTEM

FIELD OF INVENTION

This invention relates to Interactive Voice Response (IVR) systems and in particular to a method of presenting menus to users of IVR systems including presentation of audio formatted Web pages.

BACKGROUND OF THE INVENTION

IVR systems have been used to interact with callers for various purposes. Most IVR systems present a menu of items for a caller to pick an item. The menu is presented as a sequence of audio messages to the caller. Typically, the caller presses the keys of a telephone, or other input device, to communicate with the IVR systems.

Audio messages from the IVR systems provide callers with information and further prompt the callers to enter data or to make selections from a variety of choices. One example of such an audio message is: "for choice A, press one; for choice B, press two; for choice C, press three . . . ". If the number of choices is large, it may be necessary to present the choices in more than one menu. In that case, the final part of the message prompts the caller to provide a particular input in order to receive an additional message that lists other choices (e.g. "Press nine to hear more options"). Callers navigate through IVR systems by providing appropriate input in response to each message in order to get to the next desired message or to select a desired choice.

A disadvantage of IVR systems to date is that, as the functionality (i.e. number of choices) of the system increases, the number and complexity of the prompt messages increases. In some instances, it may become very difficult for a caller to navigate through an IVR system to a desired choice. IVR systems to date do not adequately address the problem of increasing system functionality without appreciably increasing the difficulty of use. In particular, it may be very difficult to navigate through a Web page converted to an audio format using above IVR systems where the menus are effectively limited to ten choices per menu.

A further disadvantage of IVR systems to date is that a caller must look at the telephone keypad, hunt for the right key, and then press it in order to select a menu item. For a caller who is using a wireless telephone, this involves removing the handset from his/her ear and then looking at the keypad and pressing the correct key. This can be cumbersome, especially if the caller is driving at the same time. Furthermore, immediately after pressing a key selection, further instructions may be issued by an IVR system, which may be missed by a caller as he/she may be putting their handset back to his/her ear.

SUMMARY OF THE INVENTION

The disadvantages of conventional menu presentation in an IVR system can be reduced by inserting an audio space between the presentation of each of the items and, at any time during the presentation of an item and the audio space thereafter, receiving any key press from an input device of a caller to indicate the selection of the item just presented. The IVR system presents the next item on the menu after each audio space following the previous, unselected, item. The menu items of a list are repeated if no item is selected after a presentation. If there has not been a selection after a number of repetitions, the IVR system may present an option to exit the system or to transfer to a live operator.

It is a further aspect of the present invention to assign a skip key in the IVR system, which when pressed by a user, indicates skipping to the next item on the list thus shortening the time required to present the list of items.

It is a further aspect of the present invention to provide a menu presentation of an IVR system using voice recognition to detect "YES" and "NO" to indicate a selection and a skipping respectively.

It is a further aspect of the present invention to facilitate conversion of Web pages into an audio menu by playing text associated with each selection and inserting an audio space after the text of each selection for selection by a user or for skipping to the next selection.

According to an aspect of the invention, there is provided a method of presenting an item from a menu of an IVR system for selection, comprising: presenting the item to a caller; presenting an audio space to the caller; and detecting any of a number of inputs from an input device during the presentation of the item and the audio space to indicate the selection of the item by the caller.

According to a further aspect of the invention, there is provided a method of presenting a Web page in an audio format to a user, comprising: converting selectable items in the Web page into the audio format; inserting an audio space after each of the items; presenting the items and associated audio spaces to the caller; and detecting any of a number of inputs from an input device during the presentation of an item and associated audio space to indicate the selection of the item by the caller.

BRIEF INTRODUCTION TO THE DRAWINGS

DETAILED DESCRIPTION OF THE PREFERRED EMBODIMENTS

Figure 1:
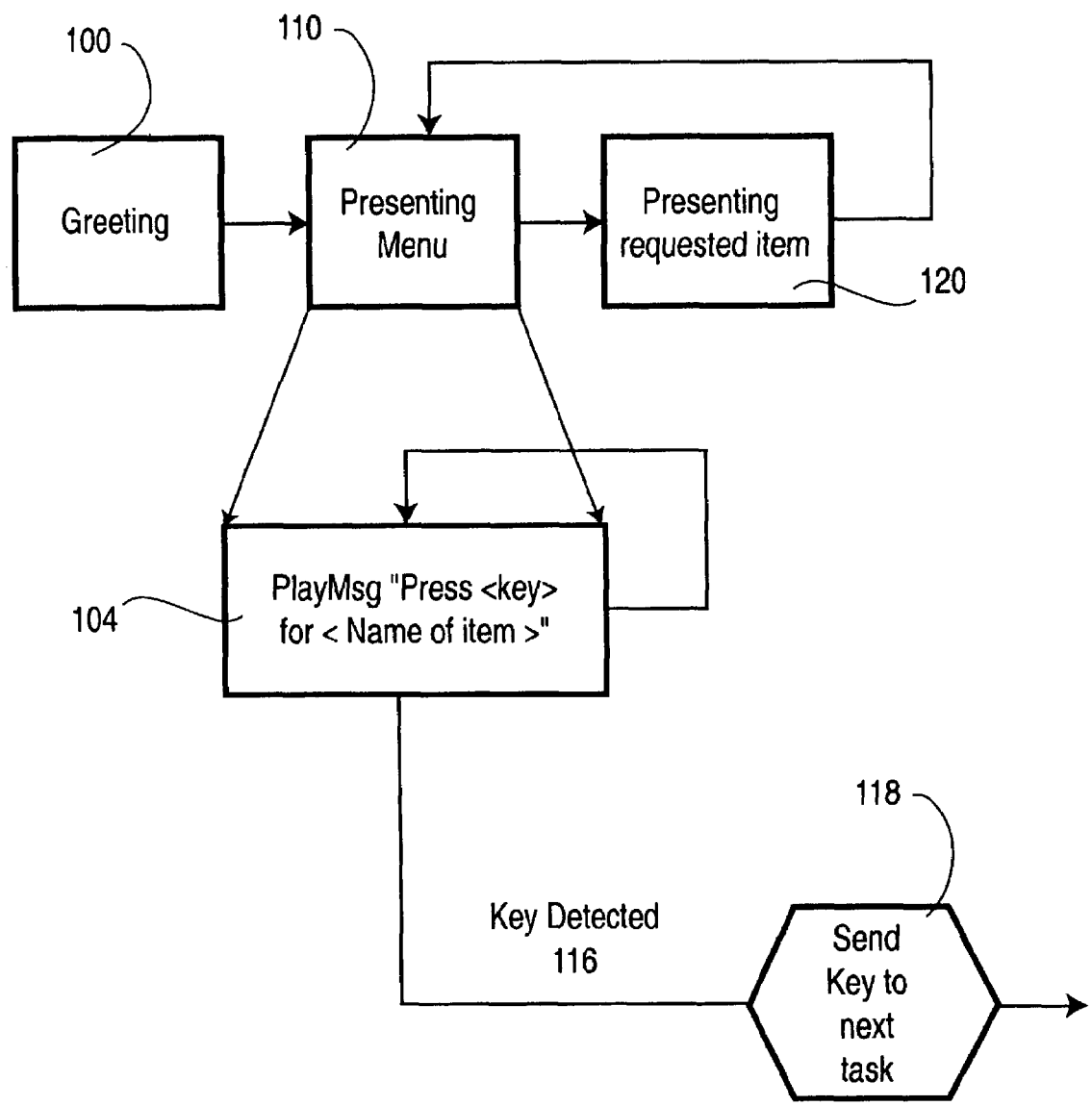
FIG. 1 is a block diagram of a conventional menu presentation in an IVR system.

Referring to FIG. 1, a block diagram of a conventional menu presentation in an IVR system is shown. In the conventional menu presentation, the IVR system comprises a greeting 100, presenting a menu 110, and presenting requested item 120 where the presenting the menu 110 is repeated once the requested information 120 has been presented. The menu 110 comprises a play message 104 of "Press <key> for <name of item>", which is repeated for each item until a key press of a key number for the desired item is detected 116, there upon a user is sent to next task 118. The next task may be a new list of items for play message 104 to play, but in due course, the requested item 120 is presented.

Figure 2:
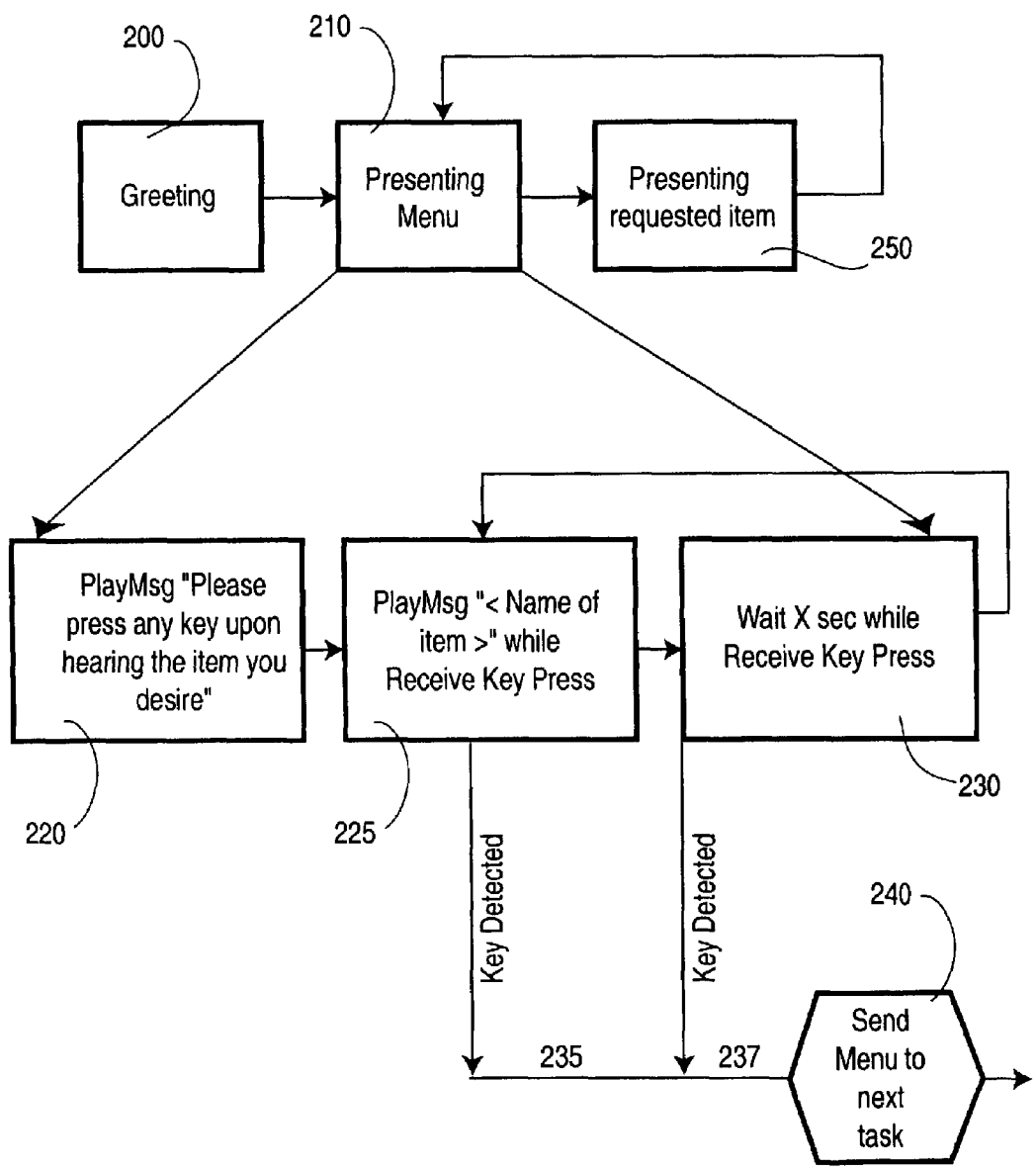
FIG. 2 is a block diagram of a menu presentation in an IVR system in accordance with a preferred embodiment of the present invention.

Referring to FIG. 2, a block diagram of a menu presentation in an IVR system in accordance with a preferred embodiment of the present invention is shown. The menu presentation of the IVR system comprises a greeting 200, presenting a menu 210, and presenting requested item 250 where presenting the menu 210 is repeated once the requested information 250 has been presented. The menu 210 comprises a play message 220 "Please press any upon hearing the item you desire", a play message 225 for a <name of item> is presented, and wait x seconds (audio space) 230 for any key press. After waiting x seconds (audio space) 230, the play message 225 for the next item is presented. When a key press is detected 235 during the play message 225 and the associated audio space 230, the item just played or being played by the play message 225 system is selected and the system goes to next task 240. The next task 240 may be a new list of items for the play message 225, but in due course, the requested information 250 is presented.

An example menu presentation of FIG. 2 is described, solely for purposes of illustration and is not intended to limit the scope of the invention, as follows:

<Default Greeting>
"Please press a key when you hear the service that you desire"
    <Item 1> audio space
    <Item 2> audio space
    <Item 3> audio space
    <Item 4> audio space
    <Repeat from Item 1> and present an option to exit the system or to transfer to a live operator after a set number of repetitions
    <Requested Item>.

The audio space may be one second in length or other suitable time period. Any key press during "<Item #> audio space" indicates selection of the "Item #". Thus, a user does not have to look at a keypad to press the right key, as there is no right key or wrong key; every key is a right key. The keypad of a handset thus behaves as a computer mouse controller and selecting is accomplished by clicking.

It is preferable that presentation of a menu be optimized to present more popular items first. An optimization algorithm may further use any identifying information of the caller, such as that from Caller ID or CLID service, to present the items first which are mostly likely to be selected by the particular caller. The algorithm may be generated by collecting data on user selections and then statistically analyzing the collected data.

Further optimization for menu presentation include setting time to wait periods for audio spaces. The time to wait depends largely on expected user recognition of menus presented. This variable is tuned to meet the following criteria: giving users enough time to recognize and make a decision on a menu item just presented, and reducing the time it takes to present the menu so as to cover all items as quickly as possible. The goal is not to force the users to wait a long time before hearing the service he/she desires.

The two criteria are somewhat diametrically opposed, the variable time to wait, X, may be tuned empirically. One possible way of tuning X is to deploy the service with a default value for X. Then, each time a menu item is selected, the time it takes for the user to make his/her decision is collected. After many such samples as desired are collected, then the optimal value for X is statistically calculated for each menu item on the menu. Thus, there may be a number of time to wait, X, settings for the menu items.

In a further embodiment of the present invention, Internet Web pages are converted into audio format to facilitate access by devices without any display means. The links and hyperlinks are items in a Web page to be presented with an audio space after each item. The links and hyperlinks are selected during their presentation and the audio space thereafter by any key press on the input device of the caller.

Figure 3A:
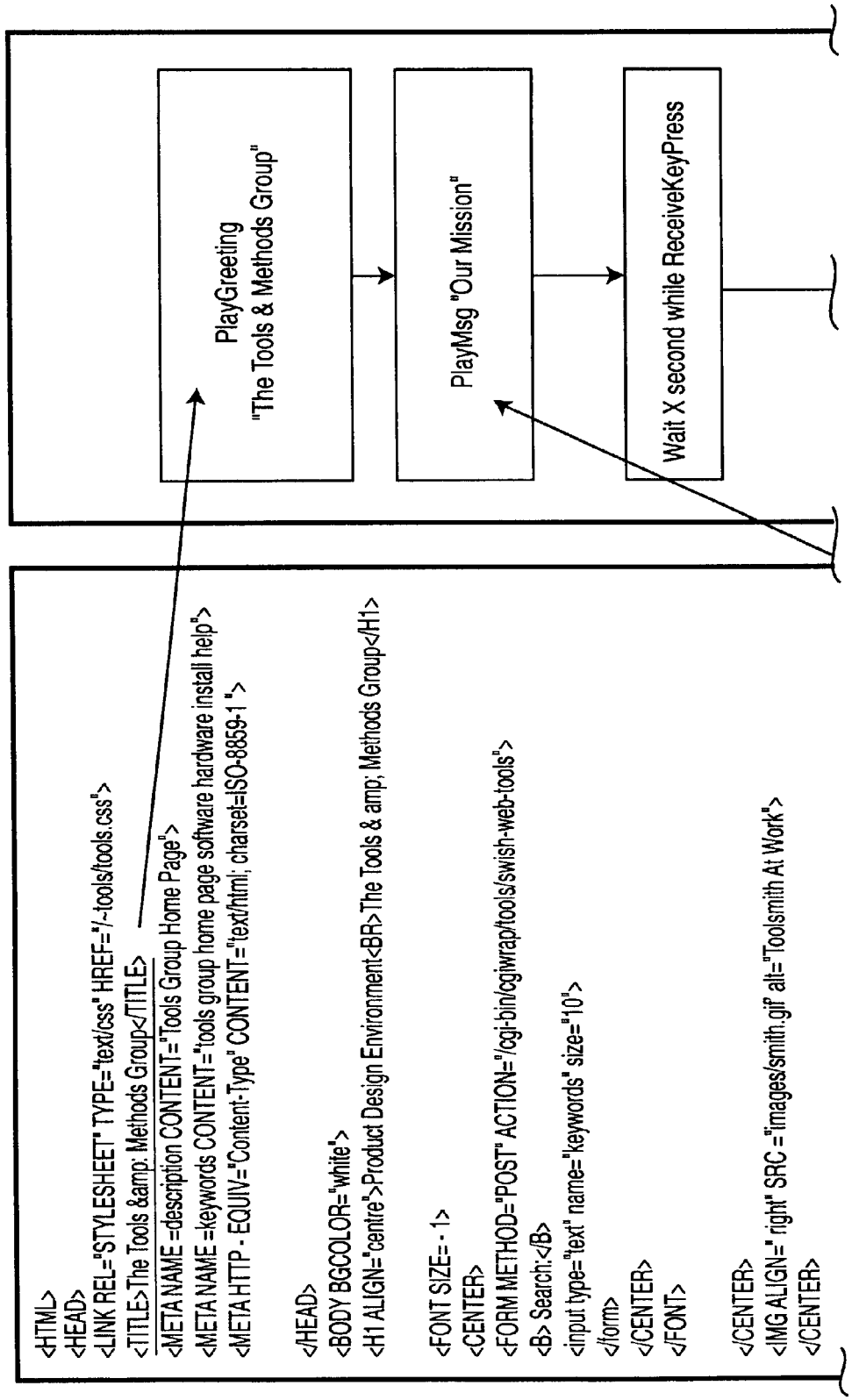
FIG. 3 is a conversion diagram of HTML hyperlinks converted to IVR menu items.
Figure 3B:
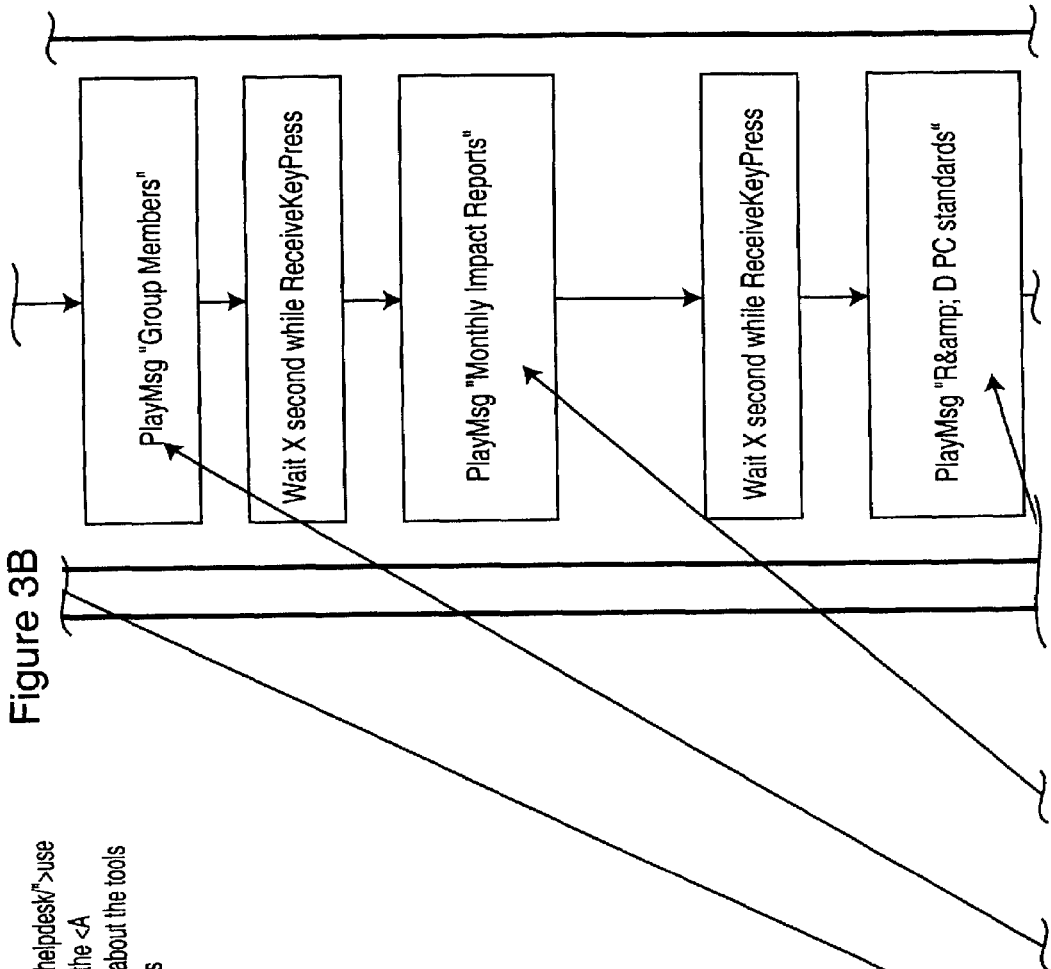
Figure 3C:
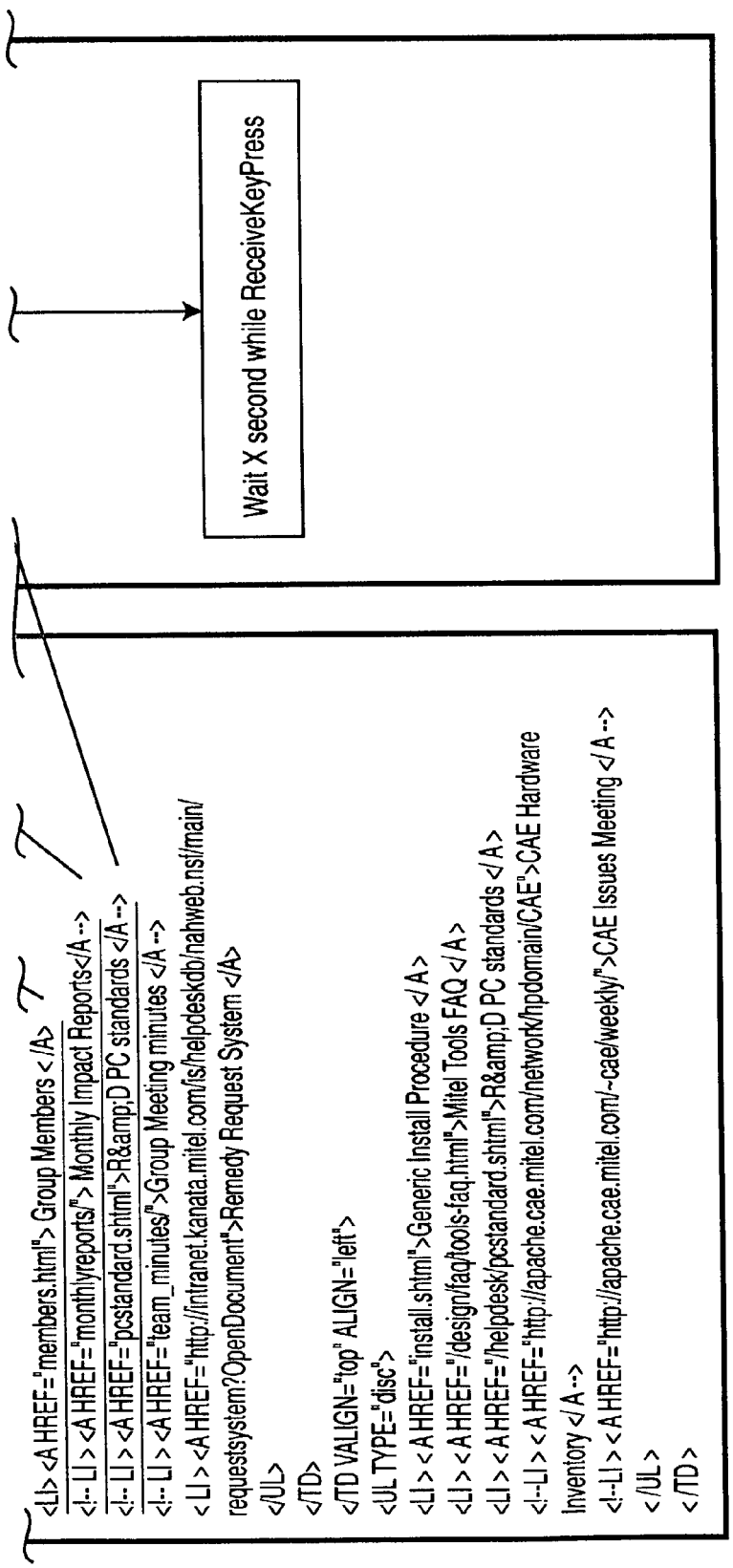

An example of Internet Web page conversion is described and shown in FIG. 3 solely for purposes of illustration and is not intended to limit the scope of the invention. As shown in FIG. 3, HTML hyperlinks are converted to IVR menu items programmatically with a conversion program where the program looks for HTML key words such as <TITLE> or <A HREF . . . > and converts them to equivalent IVR function calls. As most HTML key words are followed by the text or label of that key word, which text is displayed on the web page for such things as the title of the page or the wording of a hyperlink, these texts are then translated into IVR phrases or messages.

Figure 4:
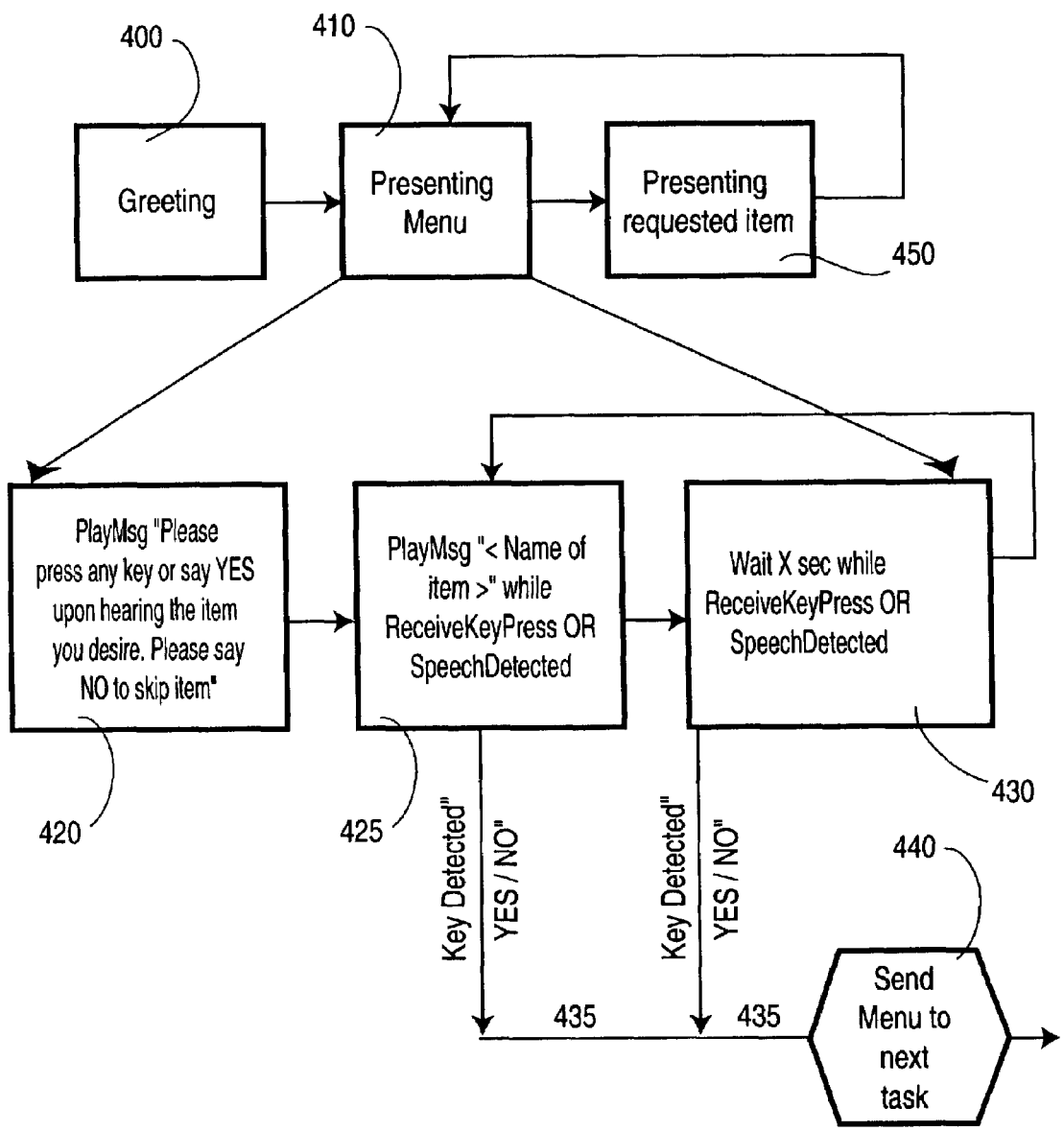
FIG. 4 is a block diagram of a menu presentation in an IVR system in accordance with a further embodiment using voice recognition.

Referring to FIG. 4, there is shown a block diagram of a menu presentation in an IVR system in accordance with a further embodiment using voice recognition. The menu presentation of the IVR system comprises a greeting 400, presenting a menu 410, and presenting requested item 450 where presenting the menu 410 is repeated once the requested information 450 has been presented. The menu 410 comprises a play message 420 "Please press any key or say YES upon hearing the item you desire. Please say NO to skip service", a play message 425 for a <name of item> is presented, and wait x seconds (audio space) 430 for any key press or voice detection of YES or NO. After waiting x seconds (audio space) 430 or upon voice detection of a NO, the play message 425 for the next item is presented. When a key press or a YES voice detection is detected 435 during the play message 425 or the associated audio space 430, the item just played by the play message 425 system is selected and the system goes to next task 440. The next task 440 may be a new list of items for the play message 425, but in due course, the requested information 450 is presented. Thus, by using a NO to skip items, the speed of menu presentation can also be increased by users.

Alternately, selection of an item can on detection by a speech recognition device on recognition of a "YES" only or of any sound from a caller, which indicates a selection.

Alternately, an IVR system according to the present invention may also provide for pressing of a certain key to skip a play message and its audio space to the next play message.

Alternately, an IVR system or Web page may also include a command to play back the last item. Such a selection may be made by a caller pressing the * or # key of a touch-tone telephone and, in an embodiment with a speech recognition device, on recognition of the word "back" or similar command.

Although preferred embodiments of the invention have been described herein, it will be understood by those skilled in the art that variations may be made thereto without departing from the spirit of the invention or the scope of the appended claims.

What is claimed is:

1. A method for employing an interactive voice response system for the selection of items from a menu, comprising:
    receiving a call from a telephone caller;
    presenting a menu of items to the caller in an order most likely to be selected by the caller using:
        identifying information of the caller, including caller ID; and
        an optimization algorithm generated by collecting data on prior caller selections and statistically analyzing collected data;
    presenting an audio space to the caller following the presentation of each respective item of the menu of items; and
    detecting any input from the caller, the any input being any one of a number;
    of possible caller generated inputs received from an input device during the presentation of the respective item and the following audio space;

wherein the any input is selected from the group consisting of a press of any number key of the input device and a voice input; and wherein:

the respective item is selected if the any input is detected during the presentation of the respective menu item and the following audio space, the press of any number key of the input device indicating selection of the respective item regardless of any predefined differences associated with pressing of individual number keys, wherein the individual number keys are visually unidentified when the selection occurs; and failure to defect the any input, during the presentation of the respective item and the associated following audio space, indicates the respective item is not selected.

2. The method of claim 1, further comprising listening for input from the caller, during the presentation of the respective item and the following audio space, which indicates a command to re-present the respective item.

3. The method of claim 1, further comprising listening for input from the caller, during the presentation of the respective item and the following audio space, which indicates a command to skip further presentation of the respective item and the following audio space.

4. The method of claim 1, further comprising skipping presentation of the respective item and the following audio space after detecting selection of the respective item.

5. The method claim 1, wherein the caller issues voice commands as the caller generated voice input and where voice recognition is used to recognize the input.

6. The method of claim 1, further comprising organizing the presentation of the menu of items in order of likely selection with the most likely selection being first.

7. The method of claim 1, wherein the caller generated input comprises pressing of any one number key of the input device, during the presentation of the respective item and the following audio space, to indicate the selection of the respective item.

8. A method of presenting a Web page in an audio format to a telephone caller, comprising:

converting selectable items in the Web page into the audio format by converting HTML hyperlinks to IVR menu items with a conversion program which looks for HTML keywords and converts said HTML keywords to equivalent IVR function calls;

inserting an audio space after each of the IVR menu items;

presenting the IVR menu items and associated audio spaces following each respective item to the caller; and detecting any one of a number of caller generated inputs from an input device during the presentation of a respective item and an associated following audio space;

wherein the any one of a number of caller generated inputs is selected from the group consisting of a press of any number key of the input device and a voice input; and wherein the respective item is selected if the any one of a number of caller generated inputs is detected during the presentation of the respective item and the associated following audio space, the press of any number key of the input device indicating selection of the respective item regardless of any predefined differences associated with pressing of individual number keys, wherein the individual number keys are visually unidentified when the selection occurs; and failure to detect the any one of a number of caller generated inputs, during the presentation of the respective item and the associated following audio space, indicates the respective item is not selected.

9. The method of claim 8, further comprising listening for input from the caller, during the presentation of the item and the audio space, which indicates a command to re-present the item.

10. The method of claim 8, further comprising listening for input from the caller, during the presentation of the respective item and the associated following audio space, which indicates a command to skip further presentation of the respective item and the associated following audio space.

11. The method of claim 8, further comprising skipping presentation of the respective item and the associated following audio space after detecting selection of the respective item.

12. The method of claim 8, wherein the caller issues voice commands as the caller generated input and where voice recognition is used to recognize the caller generated input.

13. The method of claim 8 further comprising organizing the presentation of the IVR menu items in order of likely selection with the most likely selection being first.

14. The method of claim 8 wherein the caller generated input comprises pressing of any one number key of the input device, during the presentation of the respective item and the associated following audio space, to indicate the selection of the respective item.

* * * * *